US012747012B2

(12) United States Patent
Favors et al.

(10) Patent No.: US 12,747,012 B2
(45) Date of Patent: Sep. 29, 2026

(54) MODULAR SUBSEA VEHICLE

(71) Applicant: Oceaneering International, Inc., Houston, TX (US)

(72) Inventors: Josh Favors, Houston, TX (US); Nick Rouge, Houston, TX (US)

(73) Assignee: Oceaneering International, Inc., Houston, TX (US)

( * ) Notice: Subject to any disclaimer, the term of this patent is extended or adjusted under 35 U.S.C. 154(b) by 469 days.

(21) Appl. No.: 18/371,898

(22) Filed: Sep. 22, 2023

(65) Prior Publication Data

US 2024/0101236 A1 Mar. 28, 2024

Related U.S. Application Data

(60) Provisional application No. 63/409,623, filed on Sep. 23, 2022.

(51) Int. Cl.

| | |
|---|---|
| ***B63G 8/04*** | (2006.01) |
| ***B25J 9/14*** | (2006.01) |
| ***B63G 8/00*** | (2006.01) |
| ***B63G 8/08*** | (2006.01) |

(52) U.S. Cl.
CPC .................. *B63G 8/04* (2013.01); *B25J 9/14* (2013.01); *B63G 8/001* (2013.01); *B63G 8/08* (2013.01)

(58) Field of Classification Search
CPC ... B63G 8/04; B63G 8/001; B63G 8/08; B25J 9/14
See application file for complete search history.

(56) References Cited

U.S. PATENT DOCUMENTS

| | | | | |
|---|---|---|---|---|
| 6,484,660 | B1 * | 11/2002 | English | B63G 8/38 367/133 |
| 6,854,410 | B1 * | 2/2005 | King | G01S 15/88 114/244 |
| 2008/0127878 | A1 * | 6/2008 | Marion | B63B 43/12 114/337 |
| 2019/0031308 | A1 * | 1/2019 | Daley | B63G 8/001 |

* cited by examiner

*Primary Examiner* — Stephen P Avila
(74) *Attorney, Agent, or Firm* — Maze IP Law, P.C.

(57) ABSTRACT

A modular hydrodynamic subsea vehicle comprises an upper section and a lower section, where the upper section comprises a first upper primary module, a second upper primary module operatively connected to the first upper primary module, and, optionally, one or more intermediate upper modules disposed in-between the first and second upper primary modules. The lower section is operatively connected to the upper section and comprises a first lower module, a second lower module operatively connected to the first lower primary module, and, optionally, one or more intermediate lower modules disposed in-between the first and second lower primary modules. The modules are capable of performing a desired set of functionality subsea.

19 Claims, 7 Drawing Sheets

MODULAR SUBSEA VEHICLE

RELATION TO OTHER APPLICATIONS

This application claims priority through U.S. Provisional Application 63/409,623 filed on Sep. 23, 2022.

BACKGROUND

The disclosed invention relates to the field of subsea vehicle and specifically relates to the field of modular subsea vehicles which allows multiples configuration of vehicles due commonality of parts. Subsea vehicles such as remotely operated vehicles (ROV), autonomous underwater vehicles (AUV), hybrid subsea vehicles and similar underwater vehicles include multiple components and hardware to perform as per a work requirement. Each underwater assignment typically requires a different set of functionality assistance from the subsea vehicle and, therefore, different configurations of multiple subsea vehicles are required to perform the assignment which increase the overall cost of the project. However, reconfiguring subsea vehicles is a very challenging, time consuming and cumbersome task which also leads to increase overall cost of the project. Further, utilizing multiple different configuration subsea vehicles will also increase overall cost of a project.

FIGURES

Various figures are included herein which illustrate aspects of embodiments of the disclosed inventions.

DESCRIPTION OF EXEMPLARY EMBODIMENTS

Figure 1:
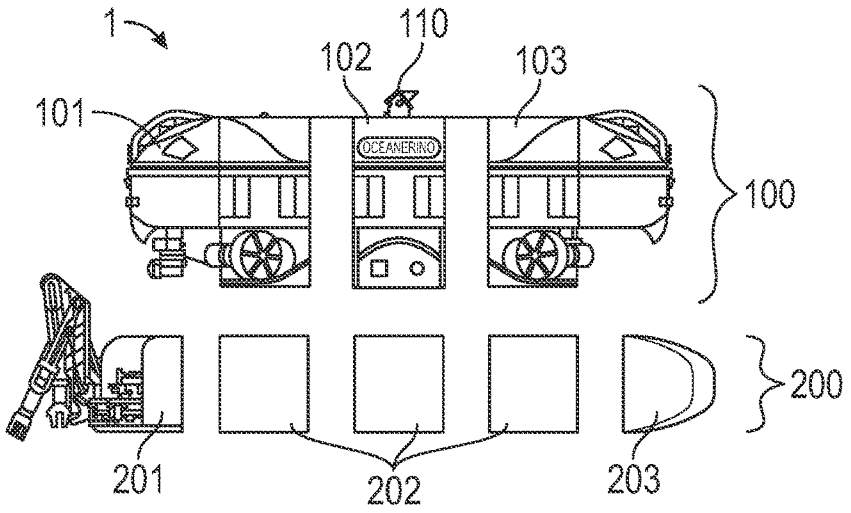
FIG. 1 is a side view in partial perspective of an exemplary modular hydrodynamic subsea vehicle illustrating an upper and a lower section.
Figure 2:
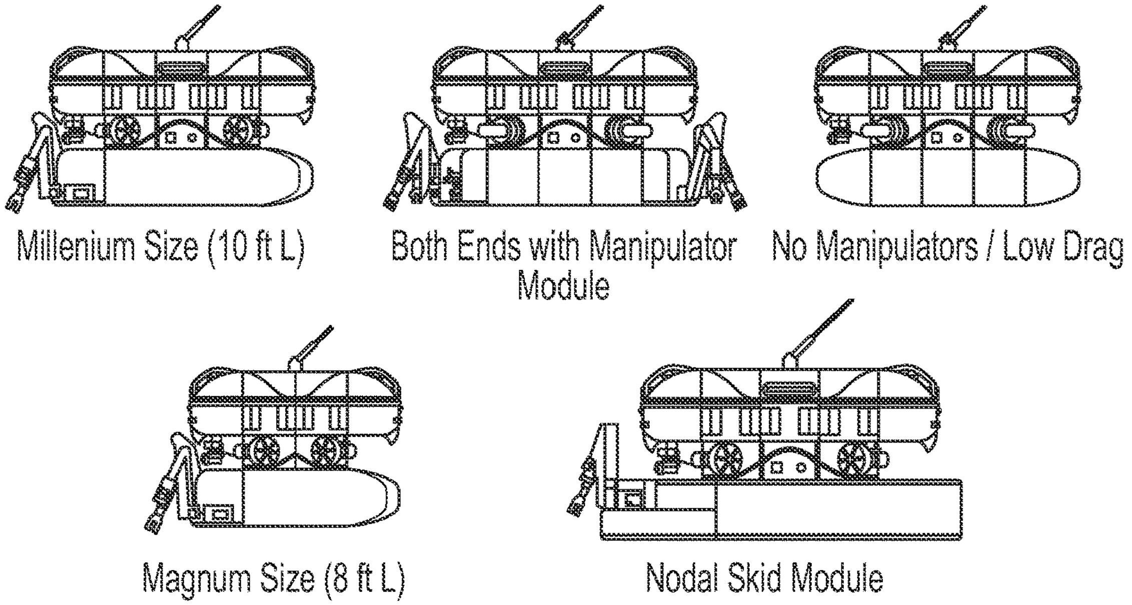
FIG. 2 are side view in partial perspective of an exemplary modular hydrodynamic subsea vehicle illustrating various configurations.
Figure 3A:
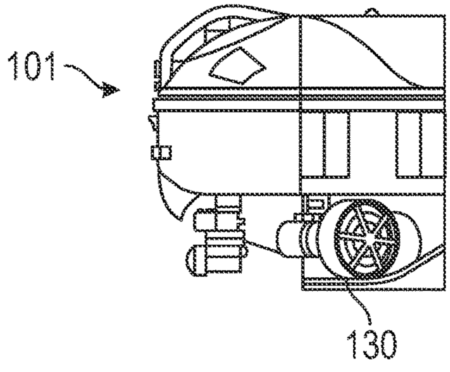
FIGS. 3A-3E are exploded views in partial perspective of an exemplary upper primary module.
Figure 3B:
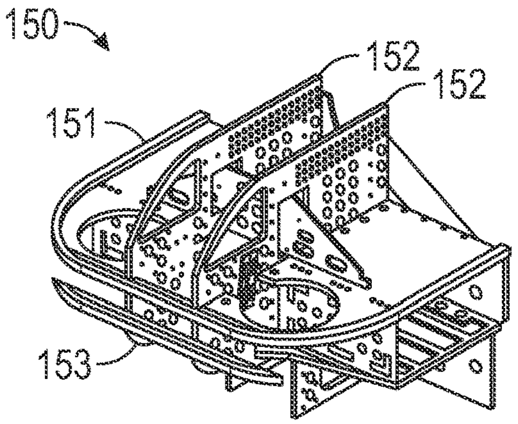
Figure 3C:
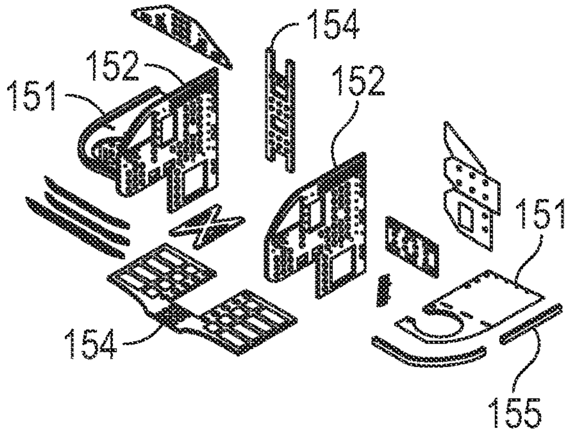
Figure 3D:
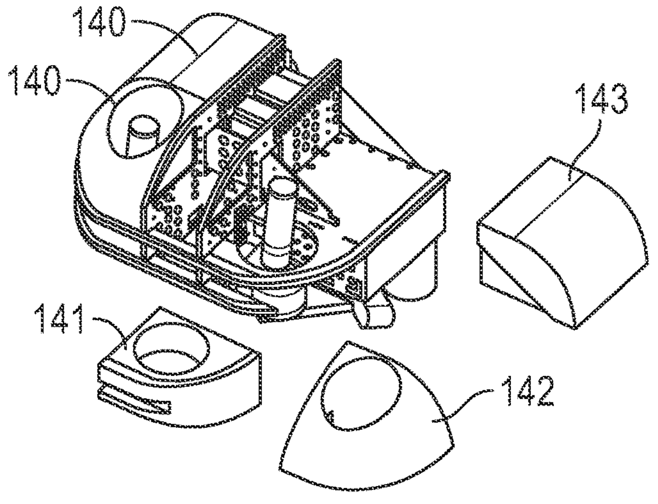
Figure 3E:
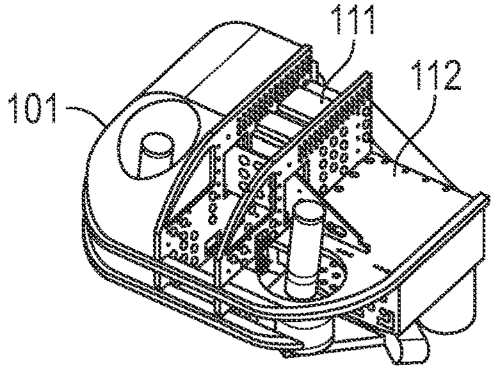
Figure 3F:
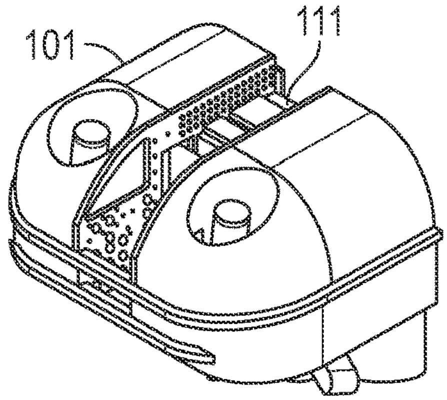

In a first embodiment, referring generally to FIG. 1, modular hydrodynamic subsea vehicle 1 is highly modular and reconfigurable and utilizes component "slices" which are portioned in a predetermined size such as two (2) feet in length and which can be added or removed as per the configuration required or as per the work requirements. As described herein, modular subsea vehicle 1 basically comprises two portions i.e., upper part 100 and lower part 200.

Figure 10:
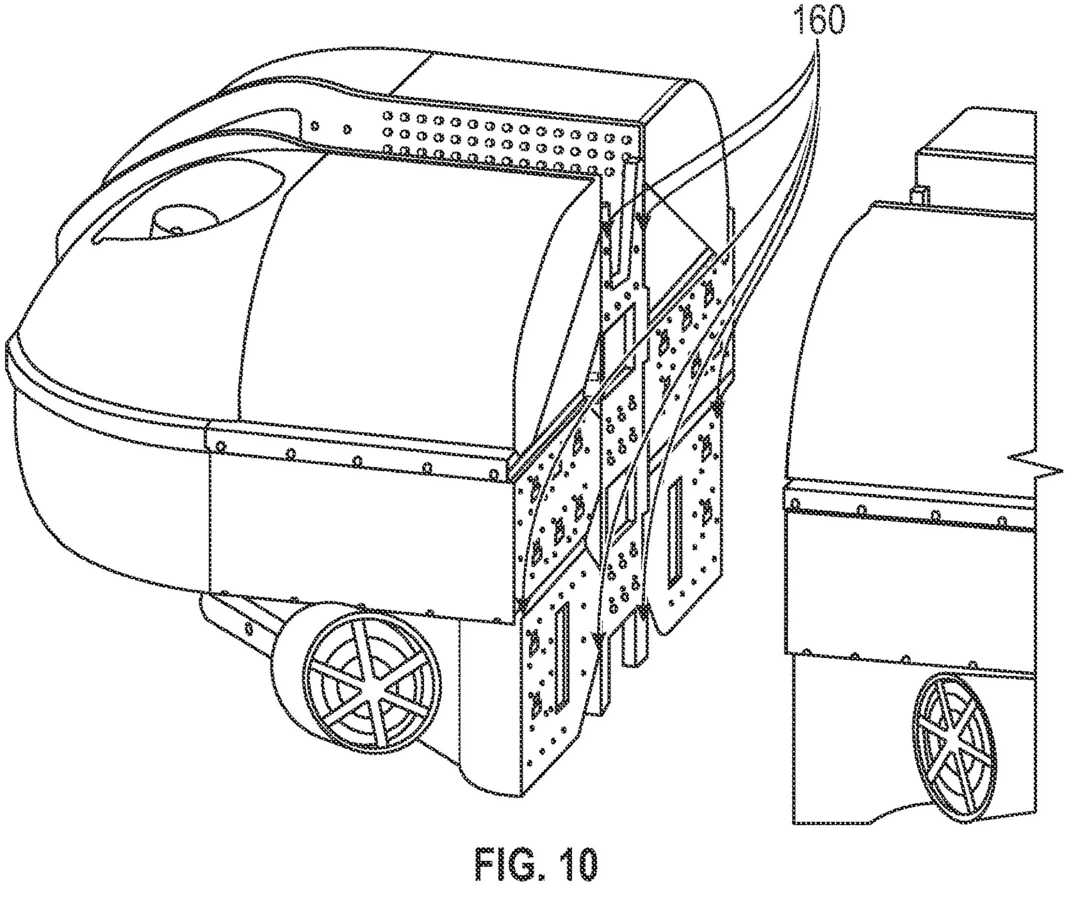
FIG. 10 illustrates a mounting configuration.

Referring to FIG. 1, in embodiments modular hydrodynamic subsea vehicle 1 comprises upper section 100, comprising first upper primary module 101, which comprises a hydrodynamic profile; second upper primary module 103, also comprising a hydrodynamic profile, which is operatively connected to first upper primary module 101 such as at mounting location 160 (FIG. 10); lower section 200 operatively connected to upper section 100, comprising first lower module 201 and second lower module 203 operatively connected to first lower module 201; and control interface 110 operatively disposed at upper section 100. Typically, upper section 100 includes primary components and hardware, described herein below, such as main body or framework which provides stiffness and strength, thruster mountings which may be vertical and/or vector; bumpers which may comprise foam blocks to provide impact resistance; an Intelligent Power and Ethernet Module (iPEM); power convertors such as DC/DC convertors; battery modules; sensors; and fairings.

Figure 11A:
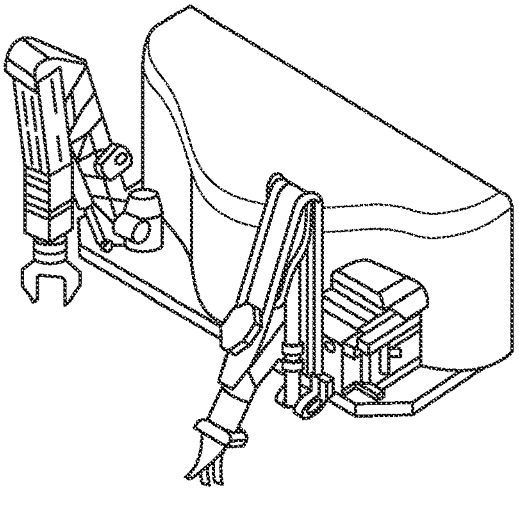
FIG. 11 illustrates a system with intermediate modules as well as placement of battery and tooling modules.
Figure 11B:
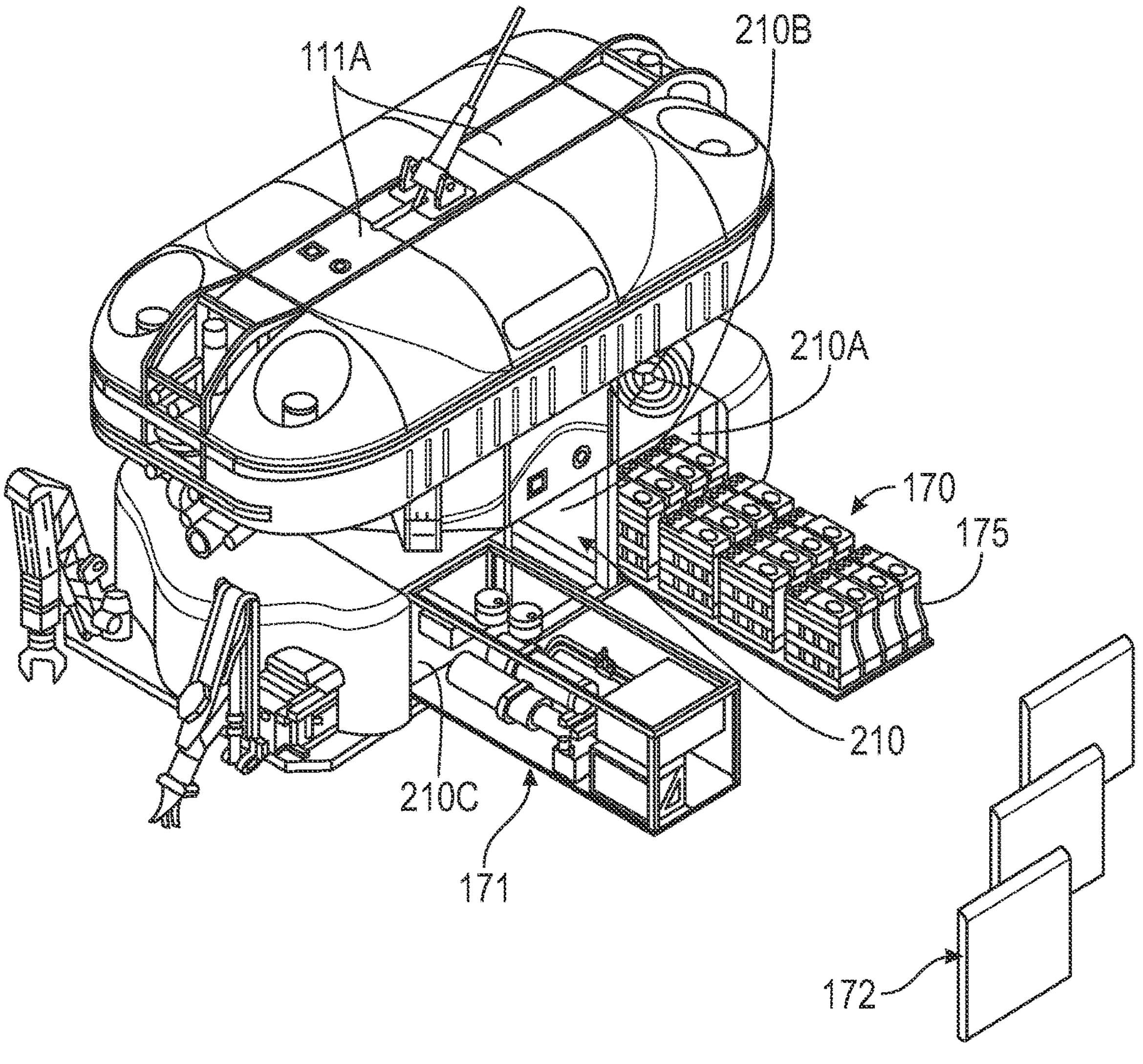
Figure 12:
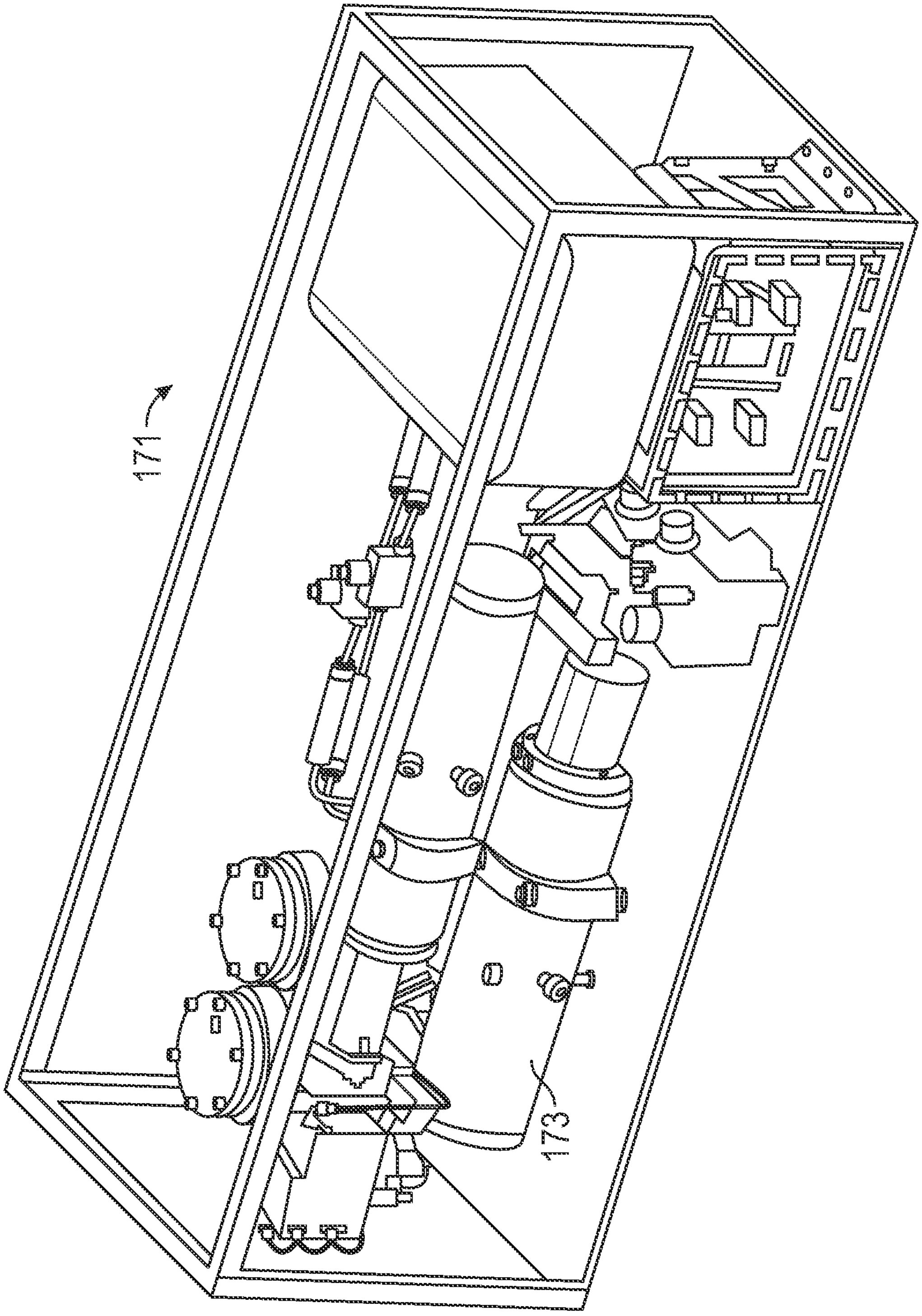
FIG. 12 illustrates an exemplary tooling module.

In embodiments and referring generally to FIGS. 3A-3E, first upper primary module 101 is substantially identical to second upper primary module 103. Typically, each upper module 101,103 comprises frame 150, a predetermined set of internal components (illustrated in FIG. 3B), and a predetermined set mounting points 119 (FIG. 11). Frame 150 may comprise a predetermined set of frame sections, e.g., a ¾" and/or 1" aluminum plate frame rail 154, one or more center frame plates 151, one or more cross brace plates 153, which can comprise aluminum; one or more frame rails 155, which can comprise aluminum, running along a length of modular hydrodynamic subsea vehicle 1; and two or more frame inner supports 152 which comprise a predetermined set of heavy-duty mounting holes 119 (FIG. 6) which may be used for mounting sensors and components. A 1" Marine board/High Density Polyethene (HDPE) which may be used where high strength is not required and can add stiffness without adding undue weight. The predetermined set of frame sections and frame inner supports 152 are typically bolted together using through bolting without using threads in aluminum or HDPE except for minor items. In addition frame 150 may comprise a box structure for high stiffness.

Figure 4:
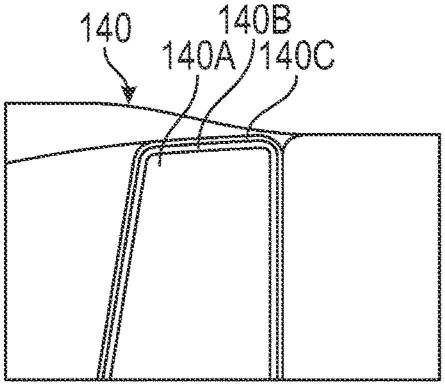
FIG. 4 is a cutaway view of a foam block.

In contemplated embodiments, each upper primary module 101,103 further comprises a predetermined set of foam blocks, e.g., foam blocks 144 (FIG. 5) and/or 145 (FIG. 6), which typically comprise selectively removable custom foam block 140 (FIG. 4), which comprises smaller and easily removable foam sections, attached to frame 150 and one or more bare foam blocks 143 (FIG. 3C) which may be used in multiple places in modular subsea vehicle 1. These are recommended to be carried as spare blocks. Selectively removable custom foam block 140 typically comprises fiberglass layers 140C (FIG. 4) and carbon fiber layers 140B (FIG. 4) wrapped for impact protection and may be attached to frame 150 using a connection with inserts. Foam blocs 140, such as bare foam blocks 143, are typically attached to frame 150 using through rods (not shown in the figures). There may be four to six bare blocks 143.

Figure 5:
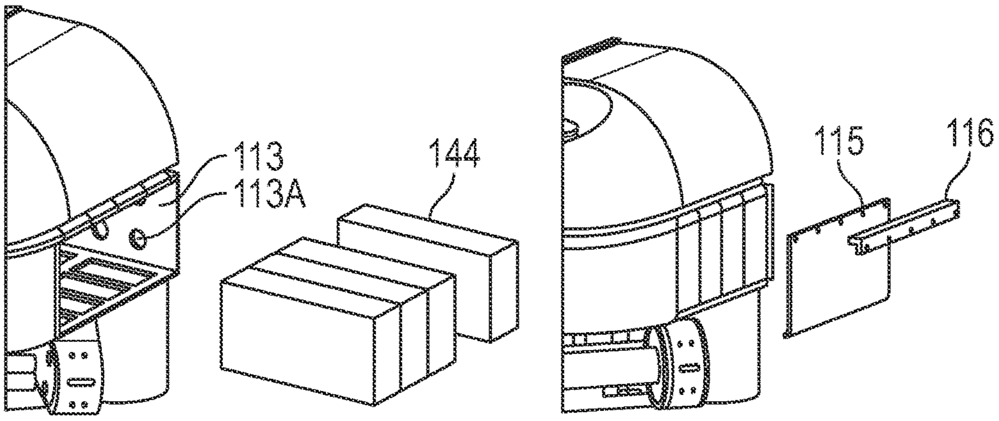
FIG. 5 are views illustrating use of foam blocks and a payload bay.

In most embodiments, at least one upper primary module 101,103 further comprises side payload bay 112 which may be around 24"×24"×12" and can be configured with a predetermined set of standard 24×12×6 reconfigurable foam blocks 114, sensors, other hardware, or the like, or a combination thereof. Side payload bay 112 is typically configured to accommodate up to 8 cubic feet reconfigurable foam blocks, e.g., foam bocks 114, and comprises port side payload bay 112 and starboard side payload bay 113 (FIG. 5). It typically has room 118 to accommodate a 3×3 grid of, e.g., foam blocks 140, and passageways 113A 117 for, e.g., mounting equipment and cable passthrough.

Figure 6:
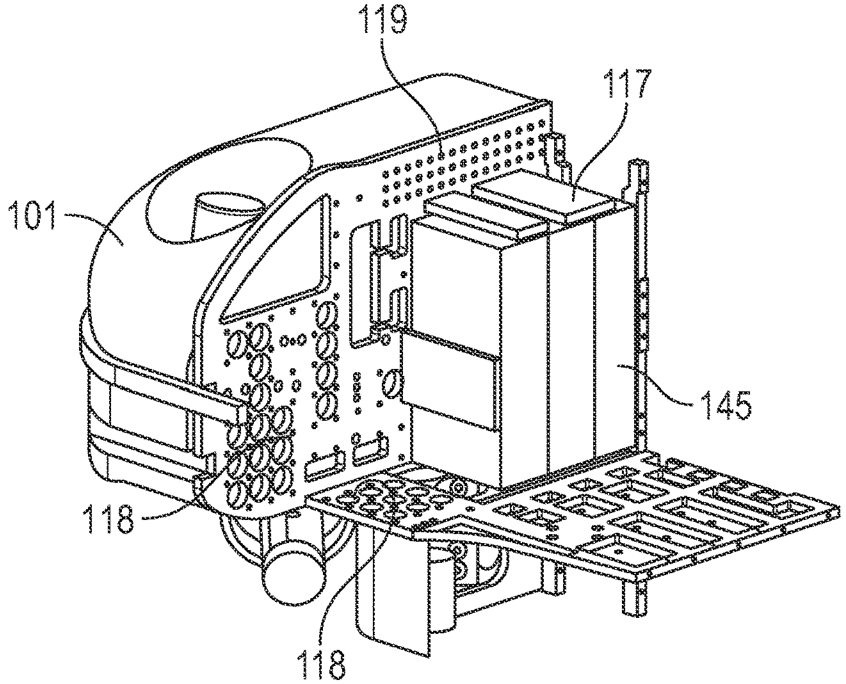
FIG. 6 is a view in partial perspective illustrating an interior portion of a primary module.
Figure 7A:
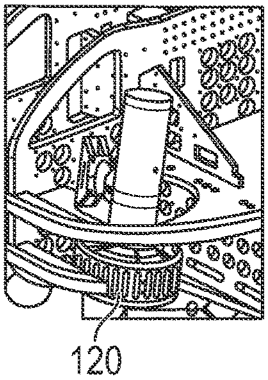
FIGS. 7A-7D illustrate thrusters.
Figure 7B:
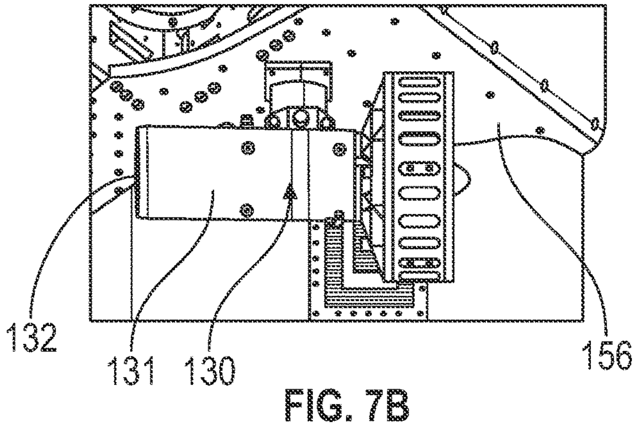
Figure 7C:
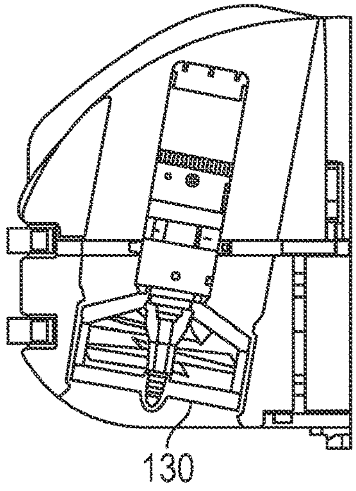
Figure 7D:
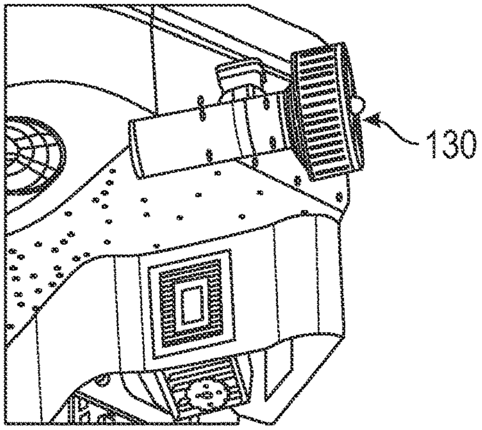

In contemplated embodiments, referring additionally to FIG. 6, at least one upper primary module 101,103 further comprises center payload bay 111, comprising a predetermined set of foam blocks 145, as well as payload bay cover 111A (FIG. 11), which can comprise a ⅛" or ¼" plastic panel 115 (FIG. 5) and bumper 116 (FIG. 5) which may comprise high density polyethylene (HDPE). Further, in contemplated embodiments, center payload bay 111 is around 12.5" wide. In certain embodiments, center payload bay 111 comprises one or more spring-loaded HDPE spacers 117 to restrain foam blocks 145 disposed within center payload bay 111. Center payload bay 111 may also have a row of holes 119 for mounting a tether or a lifting component in a desired position.

In embodiments, referring to FIGS. 7A-7D, one or each upper primary module 101,103 further comprises one or more thruster mountings 120. Where frame 150 comprises center frame plate 151 and cross brace plate 156 (FIG. 7B), thruster mounting 120 typically comprises a predetermined set of vertical thruster mounts 120 connected to center frame plate 151 and a predetermined set of vectored thruster mounts 120 connected to cross brace plate 156, which can comprise aluminum.

In addition, vertical thruster 130 may be present and mounted at a predetermined angle to thruster mounting 120, e.g., 10 degrees, whereby vehicle pitching may increase their effectiveness to re-level. In certain embodiments, vertical thruster 130 is in tunnel 131, which may be desired for hydrodynamics for maximum forward speed, as the thrust reduction can be reduced/optimized with CFD.

In embodiments, modular hydrodynamic subsea vehicle 1 further comprises a predetermined set of vectored thrusters 130 which are operatively connected to thruster mounting 120 and the predetermined set of internal components may comprise a one or more one atmosphere cans 123 to house components, one or more batteries 124, one or more iPEMS and/or DC/DC converters 125 located behind a vectored thruster 130 of the predetermined set of vectored thrusters 130, and may further comprise an exposed heat sink.

The predetermined set of vectored thrusters 130 may comprise an integrated drive; a compensator; an electrical connector; and a mechanical quick release disposed proximate a thruster pedestal.

Figure 8:
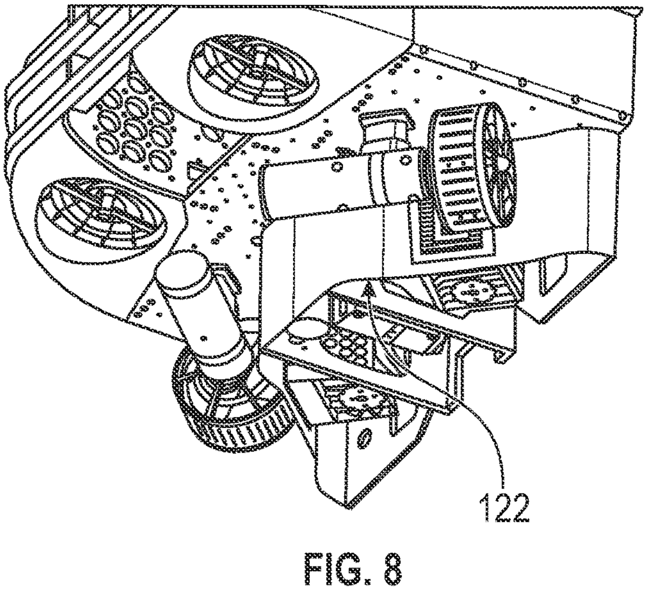
FIG. 8 illustrates a fairing.
Figure 9:
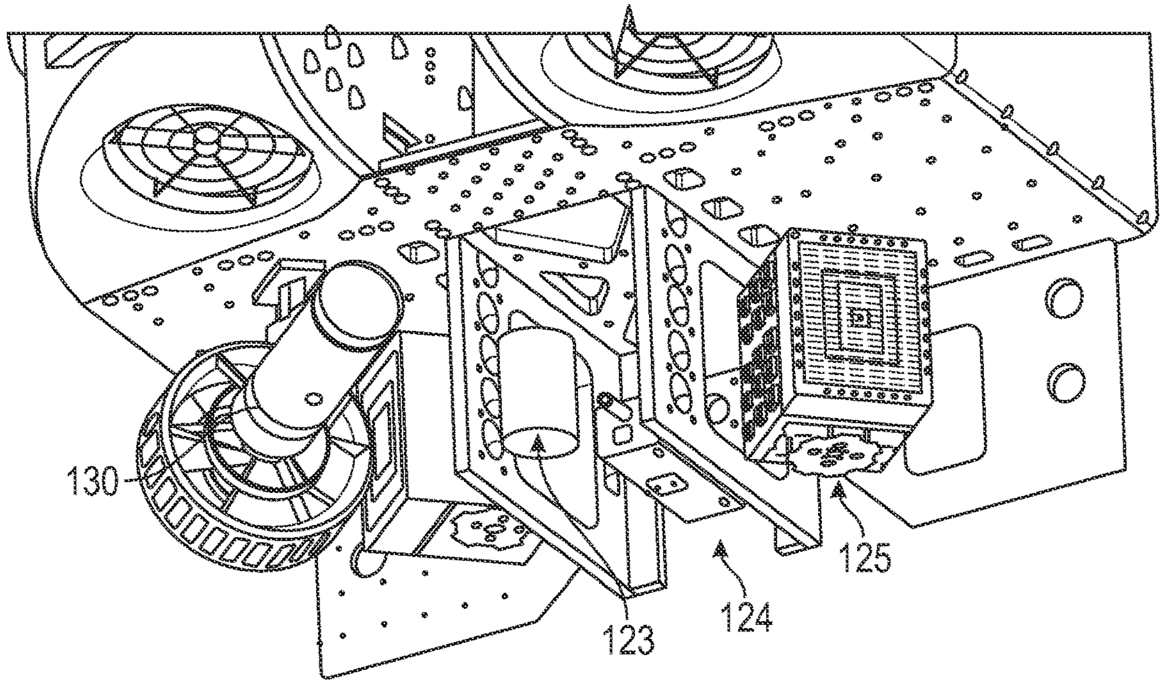
FIG. 9 illustrates placement of various hardware.

In certain embodiments, referring to FIG. 8, one or each upper primary module 101,103 further comprises a predetermined set of fairings 122, some or all of which may comprise removable fairings, disposed behind the predetermined set of vertical thruster mounts 120 and, in certain cases, vector thrusters 130 to cover the internals and decrease drag coefficient for increased speed and in embodiments comprise either fiberglass or a molded plastic panel. Thruster mounting 120 may comprise thruster exit 132 in a down direction disposed proximate an end of tunnel 131 for maximum lifting thrust.

Typically, referring to FIG. 11, at least one of first lower module 201 and second lower module 203 comprises standardized tooling module space 210 which may comprise one or more tooling hydraulic manipulator units 171 and a predetermined set of removable trays 170. Standardized tooling module space 210 is typically configured to accommodate a predetermined set of removable trays 170 and/or tooling hydraulic manipulator units 171.

Tooling hydraulic manipulator unit 171 may comprise one or more self-contained hydraulic manipulator modules 173 and may further utilize an approximately 9 GPM HPU with required valve packs for manipulators. Tooling hydraulic manipulator unit 173 may further comprise fiberglass or molded plastic fairings or covers 172 for hydrodynamics that can be easily removed for full maintenance access and a standard mating interface to mate with modular hydrodynamic subsea vehicle 1. In certain embodiments, standardized tooling module space 210 comprises a predetermined set of smaller spaces 210A,210B,210C to accommodate more than one removable tray 170 in each of the predetermined set of smaller spaces 210A,210B,210C. Removable tray 170 may comprise a power source such as batteries 175.

Tooling hydraulic manipulator unit 171 typically comprises a 20 GPM tooling HPU module with an intensifier circuit for pressure testing and the like, a 9 gallon bladder for an intensifier circuit for water glycol and the like, and a 4 station valve pack. In embodiments, tooling hydraulic manipulator unit 171 comprises two tooling hydraulic manipulator units 171 configured to operate in parallel to achieve 40 gpm flow rates.

In embodiments, first lower module 201 is substantially identical to second lower module 203.

In embodiments, control interface 110 comprises an umbilical interface.

Referring back to FIG. 1, modular hydrodynamic subsea vehicle 1 may further comprise a first predetermined set of intermediate upper modules 102 disposed intermediate, and operatively connected to, first upper primary module 101 and second upper primary module 103 such as at mounting location 160 (FIG. 10) and a second predetermined set of intermediate lower modules 202 disposed intermediate, and operatively connected to, first lower module 201 and second lower module 203. In these embodiments, one intermediate upper module 102 of the predetermined set of intermediate upper modules 120 typically comprises control interface 110.

In the operation of exemplary methods, referring back to FIG. 1, modular hydrodynamic subsea vehicle 1, which is as described above, may be configured for use by determining a set of functionality required to perform a set of desired functions subsea; selecting a first predetermined set of intermediate upper modules 101,102,103 required to achieve the desired functions subsea; and selecting a first predetermined set of intermediate lower modules 201,202,203 required to achieve the desired functions subsea. If the selected first predetermined set of intermediate upper modules 102 is greater than zero, each of the selected first predetermined set of intermediate upper modules 102 may be interconnected to form a chain of selected first predetermined set of intermediate upper modules 101,102,103 and the chain of selected first predetermined set of intermediate upper modules 102 connected to first upper primary module 101 and second upper primary module 103.

A first predetermined set of intermediate lower modules 202 may be selected as required to achieve the desired functions subsea. If the selected first predetermined set of intermediate lower modules 202 is greater than zero, each selected intermediate lower module 202 of the selected first predetermined set of intermediate lower modules 202 are connected to at least one other of the selected intermediate lower module 202 of the selected first predetermined set of intermediate lower modules 202 and the upper section 101,102,103 operatively connected to lower section 201,202,203.

First upper primary module 101 and second upper primary module 103 and, if present, the chain of selected first predetermined set of intermediate upper modules 102, may be fastened together with at least six mounting points such as at mounting location 160 (FIG. 10), e.g., four on center frame rails 154 and two on the far port/starboard sides such as by using a self-aligning mount that uses bolts to draw the chain of selected first predetermined set of intermediate upper modules 102 to first upper primary module 101 and second upper primary module 103 together.

If present, a predetermined set of vectored thrusters 130 may be operatively connected to one or more thruster mountings 120 which are as described above. In such embodiments, vectored thrusters 130 may be removed from thruster mountings 120 by disconnecting a single electrical connector and a mechanical "quick release" on a thruster pedestal to gain full access to an iPEM.

Modular hydrodynamic subsea vehicle 1 may also be seamlessly convertable from a hybrid electric-hydraulic to an all-electric vehicle with similar capabilities by selection of the modules to be used. It is also noted that bare foam block 143 may be the same for both primary modules 101,103 and fixed on a port and starboard side, and also on a center module if used.

The foregoing disclosure and description of the inventions are illustrative and explanatory. Various changes in the size, shape, and materials, as well as in the details of the illustrative construction and/or an illustrative method may be made without departing from the spirit of the invention.

The invention claimed is:

1. A modular hydrodynamic subsea vehicle, comprising:
- a. an upper section, comprising:
  - i. a first upper primary module comprising a hydrodynamic profile; and
  - ii. a separate, second upper primary module comprising a hydrodynamic profile and operatively connected to the first upper primary module without sharing a common outer housing;
- b. a lower section operatively connected to the upper section without sharing a common outer housing, comprising:
  - i. a first lower module; and
  - ii. a separate, second lower module operatively connected to the first lower module without sharing a common outer housing;
- c. a control interface operatively disposed at the upper section.

2. The modular hydrodynamic subsea vehicle of claim 1, wherein the first upper primary module is identical to the second upper primary module.

3. The modular hydrodynamic subsea vehicle of claim 1, wherein the first lower module is identical to the second lower module.

4. The modular hydrodynamic subsea vehicle of claim 1, wherein the control interface comprises an umbilical interface.

5. The modular hydrodynamic subsea vehicle of claim 1, wherein each of the first upper primary module and the second upper primary module comprises:
- a. a frame;
- b. a predetermined set of internal components; and
- c. a predetermined set mounting points.

6. The modular hydrodynamic subsea vehicle of claim 5, wherein each of the first upper primary module and the second upper primary module further comprises a predetermined set of foam blocks.

7. The modular hydrodynamic subsea vehicle of claim 1, wherein at least one of the first upper primary module and the second upper primary module further comprises a side payload bay.

8. The modular hydrodynamic subsea vehicle of claim 1, wherein at least one of the first upper primary module and the second upper primary module further comprises a center payload bay comprising a predetermined set of foam blocks.

9. The modular hydrodynamic subsea vehicle of claim 8, wherein the center payload bay comprises:
- a. a payload bay cover; and
- b. a panel.

10. The modular hydrodynamic subsea vehicle of claim 8, wherein the center payload bay further comprises a row of holes for mounting a tether or a lifting component in a desired position.

11. The modular hydrodynamic subsea vehicle of claim 5, wherein at least one of the first upper primary module and the second upper primary module further comprises a thruster mounting.

12. The modular hydrodynamic subsea vehicle of claim 11, wherein:
- a. the frame comprises a center frame plate and a cross brace plate; and
- b. the thruster mounting comprises:
  - i. a predetermined set of vertical thruster mounts connected to the center frame plate; and
  - ii. a predetermined set of vectored thruster mounts connected to the cross brace plate.

13. The modular hydrodynamic subsea vehicle of claim 12, wherein at least one of the first upper primary module and the second upper primary module further comprises a predetermined set of fairings disposed behind the predetermined set of vertical thruster mounts.

14. The modular hydrodynamic subsea vehicle of claim 11, wherein:
- a. the modular hydrodynamic subsea vehicle further comprises a predetermined set of vectored thrusters operatively connected to the thruster mounting; and
- b. the predetermined set of internal components comprises iPEMS and/or DC/DC converters located behind a vectored thruster of the predetermined set of vectored thrusters.

15. The modular hydrodynamic subsea vehicle of claim 1, wherein at least one of the first lower module and the second lower module comprises a tooling module space.

16. The modular hydrodynamic subsea vehicle of claim 15, wherein the tooling module space comprises:
- a. a tooling hydraulic manipulator unit; and
- b. a predetermined set of removable trays.

17. The modular hydrodynamic subsea vehicle of claim 1, further comprising:
- a. a first predetermined set of intermediate upper modules disposed intermediate, and operatively connected to, the first upper primary module and the second upper primary module; and
- b. a second predetermined set of intermediate lower modules disposed intermediate, and operatively connected to, the first lower module and the second lower module.

18. The modular hydrodynamic subsea vehicle of claim 17, wherein one intermediate upper module of the predetermined set of intermediate upper modules comprises the control interface.

19. A method of configuring a modular hydrodynamic subsea vehicle, the hydrodynamic subsea vehicle comprising an upper section, comprising a first upper primary module and a second upper primary module operatively connected to the first upper primary module without sharing a common outer housing, and a lower section operatively connected to the upper section without sharing a common outer housing, comprising a first lower module and a second lower module operatively connected to the first lower primary module without sharing a common outer housing, the method comprising:

a. determining a set of functionality required to perform a set of desired functions subsea;
b. selecting a first predetermined set of intermediate upper modules required to achieve the desired set of functions subsea;
c. selecting a first predetermined set of intermediate lower modules required to achieve the set of desired functions subsea;
d. if the selected first predetermined set of intermediate upper modules is greater than zero,
   i. interconnecting each of the selected first predetermined set of intermediate upper modules to form a chain of selected first predetermined set of intermediate upper modules without sharing a common outer housing; and
   ii. connecting the chain of selected first predetermined set of intermediate upper modules to the first upper primary module and the second upper primary module;
e. selecting a first predetermined set of intermediate lower modules required to achieve the desired functions subsea;
f. if the selected first predetermined set of intermediate lower modules is greater than zero, connecting each selected intermediate lower module of the selected first predetermined set of intermediate lower modules to at least one other of the selected intermediate lower module of the selected first predetermined set of intermediate lower modules without sharing a common outer housing; and
g. operatively connecting the upper section to the lower section.

* * * * *